March 6, 1951 — A. T. GAUDIN — 2,544,453
MACHINE FOR MANUFACTURING PIPES
Filed Jan. 8, 1946
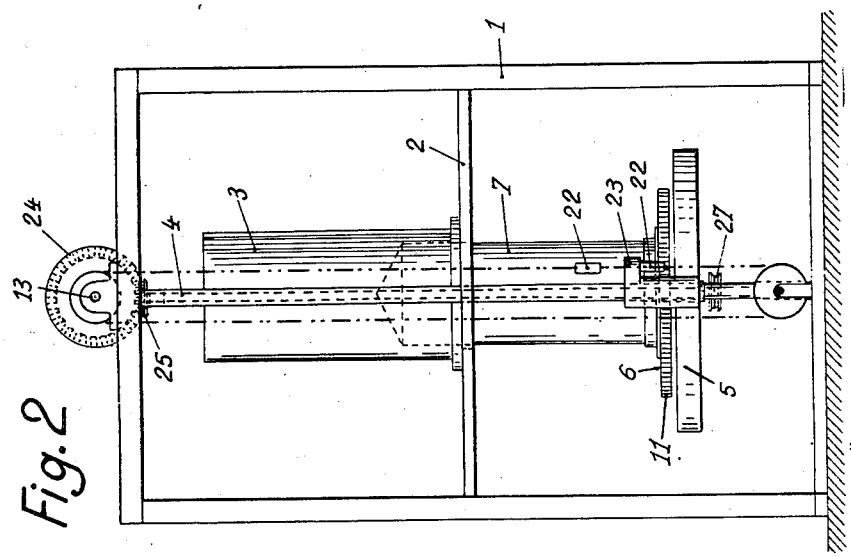
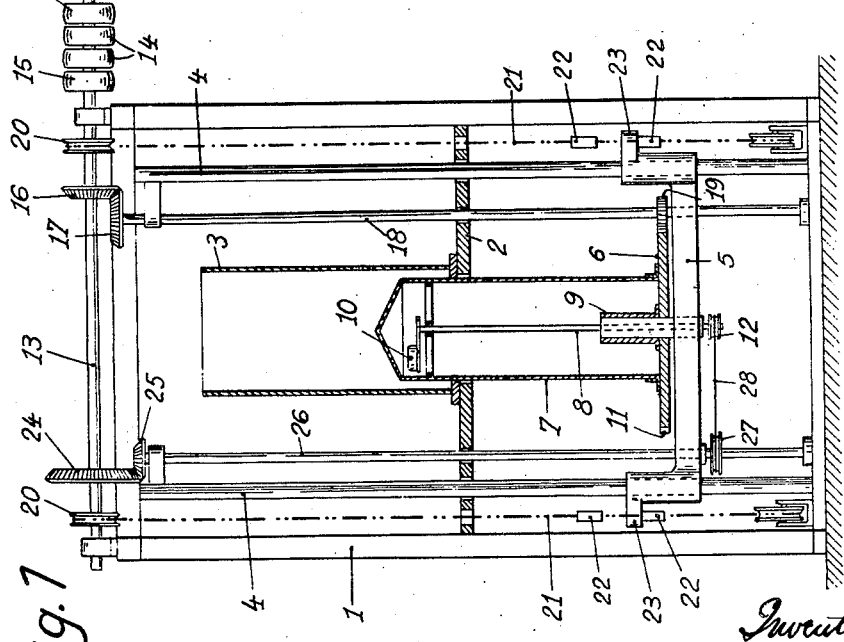

Patented Mar. 6, 1951

2,544,453

UNITED STATES PATENT OFFICE 2,544,453

MACHINE FOR MANUFACTURING PIPES

Armand Théodore Gaudin, Montrouge, France

Application January 8, 1946, Serial No. 639,768
In France September 19, 1941

Section 1, Public Law 690, August 8, 1946
Patent expires September 19, 1961

4 Claims. (Cl. 25—36)

1

The present invention has for its object a means for the manufacture of pipes of agglomerated materials, which enable to obtain high-class products by means of a relatively simple apparatus.

In one aspect, this invention comprises a moulding machine for manufacturing pipes in which raw materials are introduced into a mould casing in which they are caused to receive the required form by means of a core arranged to move axially within the casing, in counter-movement to the materials, while rotating about its axis and vibrated preferably at the point where the materials are fed in between the mould casing and the core.

According to one feature of this invention, the core, movable in the vertical direction, is mounted upon a sliding platform, the displacements of which, in the vertical direction, are controlled from a driving shaft adapted to rotate in one direction and the other, which transmits its movement to the platform, by means of two respective transmissions, so as to rise or to lower the same.

According to a convenient practical embodiment of this invention, the core is fitted with a crown-spur-wheel gearing into a pinion keyed on a secondary shaft controlled by the driving shaft, said pinion being adapted to move longitudinally along said secondary shaft so as to follow the vertical displacement of the core while gearing into said spur-wheel.

The vibrating means provided at the upper part of the core comprises a mass mounted eccentrically on a shaft parallel to the axis of and disposed inside the core. Said vibrating means is rotated from the driving shaft by means of a convenient transmission adapted to follow the different positions of the core without transmission of the movement being interrupted.

According to another feature of the invention, means are provided for securing a time interval between the instant where the core begins to rotate and the instant where the platform is lifted or lowered. In a convenient practical embodiment according to which displacements of the platform are obtained by means of stops fitted on endless chains controlling said displacements, two such stops cooperating with a corresponding abutment on the platform are provided on each controlling chain, so as to reserve, before each up—or down—stroke of the platform, dead-time corresponding to the distance between the said stops.

According to a further feature of the invention, the vibrating means is set in action through a mechanism, such as a free-wheel, which is operated by the driving shaft only when the latter rotates in a direction corresponding to the up-stroke of the platform.

Other features and characteristics of the present invention will result from the following description of a practical embodiment thereof, given merely by way of example, with reference to the accompanying drawings in which:

Figure 1 is a front view, partly in section; and

Figure 2 is a corresponding side view of the machine.

The machine comprises a frame 1, which, at about the middle of its height, is provided with a fixed platform 2 carrying mould casings 3 for the pipes to be manufactured.

Inside the frame 1 are disposed vertical columns 4, along which can be displaced a movable platform 5 carrying a rotatable support 6 for the mould cores 7 which cooperate with the moulds 3 to built up the pipes. Inside each hollow core 7 is provided a rotatable shaft 8 passing through a bush 9 fitted on platform 5. At the upper end of the shaft 8 which is preferably flexible is mounted eccentrically a mass 10.

The support 6 of the core 7 is provided at its periphery with a spur-crown 11, and at the inner end of the shaft 8 is wedged a grooved sheave 12.

The different parts of the machine are set in motion by means of a driving shaft 13 mounted horizontally at the upper part of frame 1. On the driving shaft 13 are provided two idle pulleys 14 and two driving pulleys 15 respectively driven by a straight and a crossed belt, so that the shaft can be rotated in one direction or the other.

On the shaft 13 are keyed:

1. A pinion 16 controlling the rotation of the core. Said pinion meshes with a bevel gear 17 keyed on a secondary shaft 18 on which is mounted a pinion 19 adapted to slide along said shaft and meshing with the spur wheel 11 of the support 6.

2. Two chain sprocket wheels 20 for endless chains 21 each of which are provided with stops 22 disposed at a certain distance one from the other and cooperating with abutments 23 provided on the platform 5.

3. A pinion 24 meshing with a bevel gear 25 keyed on a secondary shaft 26 and provided with a free-wheel system so as to rotate said shaft 26 only in one direction. At the inner end of shaft 26 is mounted a grooved sheave 27 connected by means of a belt 28 to the grooved pulley 12. The pulley 27 is mounted in a known manner, so as to follow the up and down displacements of the platform 5.

The operation of the machine is as follows:

The movable platform 5 being in its lower position and mould 3 and the corresponding core 7 being placed in position, the driving shaft 13 is set in motion by displacing the two controlling belts so as one of them controls the pulley 15 which corresponds to the driving of the shaft 13 in the sense causing the up-stroke of the platform 5 and of the core 7. At this moment, the upper stops 22 are in contact with the upper parts of the abutments 23, since these upper stops have acted upon the platform in the sense of lowering the same during the preceding operation.

The core 7 is, therefore, set in rotation by means of the intermediary shaft 18 and pinion 19, and this rotation will keep on during the entire up-stroke, the pinion 19 resting constantly in mesh with the spur-crown 11, because of being mounted both for rotation and sliding on the shaft 18, for example by means for keying and of position dependency relatively to the platform 5.

At first, the endless chains travel effectlessly during the course corresponding to the distance between the two stops 22. Then the lower stops 22 strike lower faces of abutments 23 and draw up the platform 5 and the core 7, while the latter is rotating, as previously described.

During this double movement of rotation and lifting of the core 7, the pinion 24 which because of its mounting is presently in active position causes the intermediary shaft 26 to rotate, whereby the mass excentrically mounted on the upper end of the vibration shaft 8 is in its turn set in action, at the desired speed, through the bevel gears 24, 25 and grooved sheaves 27, 12.

In this manner, the materials fed in at the upper part of the mould casing 3 and introduced between the core and the casing as said core travels up, are energetically and efficiently vibrated as they arrive therebetween for making the pipe.

When the core attains to its uppermost position and the pipe is formed, the both drive belts are simultaneously switched by throwing the belt which has been in action over onto the neighbouring idle pulley 14 and the other belt over onto the other driving pulley 15, whereby the driving shaft 13 as well as the core 7 are now caused to rotate in the reverse sense. The lower stops 22 lose their contact with the lower faces of abutments 23 whilst the upper stops 22, after travelling for some time during which the inverse rotation of the core 7 has begun, strike against the upper faces of abutments 23 and thus contribute to the down-stroke movement of both platform 5 and core 7, the latter continuing to rotate As the core is moving downward helicoidally in relation to the article, conduit or pipe, formed within the mould casing 3, it is clear that the inside walls of such article will be free from any tearing out of material. As, on the other part, the bevel gears 24, 25 and vibrating device remain out of action during the down-stroke of the core, it is equally clear that the release operation will take place in the best possible conditions.

When the platform 5 has arrived at the end of its down-stroke and the core got out of the article formed, the mould casing 3, together with the article formed therein, is withdrawn from the machine; a new empty mould casing is then set in place for a new moulding operation to be effected.

It is understood that the constructional details could be varied from those described and shown in the drawings without interfering with the essential features of the invention. By way of example, oval pipes may also be manufactured if a suitable movement is imparted to the core, e. g. by means of appropriate cams. The core may be mounted on a support animated with a helicoidal motion. The vibrator may be of any convenient type, mechanical, electrical, etc. Any other driving means may be used for operating the various movable parts so arranged that the respective movable parts would be brought into action in proper sequence. Finally the mould casing may be arranged to rotate whilst the core be immovable.

As a matter of course, the machine comprises also various known accessory mechanisms that are necessary for its operation and that, being known, are not decribed in the aforestanding specification.

What I claim is:

1. In a machine for the manufacture of pipes or like structures of agglomerated materials, the combination of a mould casing, a sliding platform, a driving shaft adapted to rotate in a clockwise and anti-clockwise direction and transmitting its movement to the platform by means of two respective transmissions adapted to rise or to lower said platform, a core mounted upon said platform and coaxial with said mould casing, said core being fitted with a crown-spur-wheel, a secondary shaft controlled by the driving shaft, and a pinion keyed on said secondary shaft and rotating with the same, said pinion being adapted to move longitudinally along said shaft while gearing into said spur-wheel so as to follow the vertical displacements of the core.

2. In a machine for the manufacture of pipes or like structures of agglomerated materials, the combination of a mould casing, a sliding platform, a driving shaft adapted to rotate in a clockwise and anti-clockwise direction and transmitting its movement to the platform by means of two respective transmissions adapted to rise or to lower said platform, a core mounted upon said platform and coaxial with said mould casing, said core being fitted with a crown-spur-wheel, a secondary shaft controlled by the driving shaft, a pinion keyed on said secondary shaft and rotating with the same, said pinion being adapted to move longitudinally along said shaft while gearing into said spur-wheel and vibrating means provided at the upper part of the core.

3. In a machine for the manufacture of pipes or like structures of agglomerated materials, the combination of a mould casing, a sliding platform, a driving shaft adapted to rotate in a clockwise and anti-clockwise direction and transmitting its movement to the platform by means of two respective transmissions adapted to rise or to lower said platform, a core mounted upon said platform and coaxial with said mould casing, said core being fitted with a crown-spur-wheel, a secondary shaft controlled by the driving shaft, a pinion keyed on said secondary shaft and rotating with the same, said pinion being adapted to move longitudinally along said shaft while gearing into said spur-wheel and vibrating means provided at the upper part of the core and set in action by the driving shaft through a mechanism operated by said driving shaft only when the latter rotates in a direction corresponding to the up-stroke of the platform.

4. In a machine for the manufacture of pipes or like structures of agglomerated materials, the combination of a mould casing, a sliding platform, a driving shaft adapted to rotate in a clockwise and anti-clockwise direction and transmitting its movement to the platform by means of two respective endless chains, two stops on each chain cooperating with a corresponding abutment on the platform so as to reserve before each up or down-stroke of the platform dead time corresponding to the distance between the said stops, a core mounted upon said platform and coaxial with said mould-casing, and means adapted to rotate said core.

ARMAND THÉODORE GAUDIN.

REFERENCES CITED

The following references are of record in the file of this patent:

UNITED STATES PATENTS

| Number | Name | Date |
| --- | --- | --- |
| 1,297,208 | McMurtrie | Mar. 11, 1919 |
| 1,384,021 | Olsen et al. | July 5, 1921 |
| 2,321,277 | Boyle | June 8, 1943 |
| 2,356,852 | Hutchinson | Aug. 29, 1944 |